(12) United States Patent
Minami

(10) Patent No.: US 7,548,938 B2
(45) Date of Patent: Jun. 16, 2009

(54) FILE MANAGEMENT DEVICE, PRINTER, AND FILE MANAGEMENT METHOD

(75) Inventor: Eiji Minami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 269 days.

(21) Appl. No.: 11/391,339

(22) Filed: Mar. 29, 2006

(65) Prior Publication Data

US 2006/0221208 A1  Oct. 5, 2006

(30) Foreign Application Priority Data

Mar. 29, 2005  (JP) ............................. 2005-095648

(51) Int. Cl.
G06F 12/00 (2006.01)
G06F 15/16 (2006.01)

(52) U.S. Cl. ........................... 707/200; 707/1; 707/100; 709/225

(58) Field of Classification Search ........................ None
See application file for complete search history.

(56) References Cited

U.S. PATENT DOCUMENTS

| | | | |
|---|---|---|---|
| 5,355,497 A * | 10/1994 | Cohen-Levy | ............... 707/200 |
| 6,914,694 B1 * | 7/2005 | Ichikawa et al. | ............ 358/1.15 |
| 2003/0115326 A1 * | 6/2003 | Verma et al. | ................. 709/225 |
| 2005/0185225 A1 * | 8/2005 | Brawn et al. | ................. 358/401 |
| 2005/0188174 A1 * | 8/2005 | Guzak et al. | ................. 711/203 |

FOREIGN PATENT DOCUMENTS

JP  2004-171053 A  6/2004

* cited by examiner

Primary Examiner—Cam Y T Truong
Assistant Examiner—Dung K Chau
(74) Attorney, Agent, or Firm—Sughrue Mion, PLLC

(57) ABSTRACT

When a user requests the process of saving files stored in a memory card in a storage medium, such as DVD-RW, in MPV format, the multifunction printer 10 selects a file available for printing based on file extensions from the plurality of files stored in the memory card (step S130), creates a folder, and copies the selected file into the folder (step S140). The multifunction printer subsequently create and save a manifest in the folder, and stores information on saving location as asset information of the selected file in the manifest (step S160). The multifunction printer writes metadata into the asset information (step S170-S210) and registers link information to the created manifest in root manifest (step S220). A file can be readily acquired afterwards by using the root manifest and the manifest and be printed out. And files available for a predetermined usage can be managed easily.

4 Claims, 11 Drawing Sheets

FILE MANAGEMENT DEVICE, PRINTER, AND FILE MANAGEMENT METHOD

BACKGROUND OF THE INVENTION

1. Field of the Invention

The present invention relates to a file management device, a printer, and a file management method.

2. Description of the Related Art

A proposed file management device groups and manages a plurality of files. For example, a device described in Japanese Published Unexamined Patent Application No. 2004-171053 automatically groups files that satisfy a condition such that the next file has been recorded within one hour subsequent to a last file, then register this group in listing data, and uses the registered listing data to carry out a process such as reproducing of movie files.

SUMMARY OF THE INVENTION

However, in this file management device described in Japanese Published Unexamined Patent Application No. 2004-171053, since files in which the next file has been recorded within one hour subsequent to a last file are grouped, files that are not reproducible may be included in a group. Therefore, it has been difficult to manage the files.

The present invention has been made in view of such problems, and it is an object of the invention to provide a file management device, a printer, a file management method, and a program thereof that facilitate file management.

In order to achieve at least part of the above-described object, the present invention is constructed as follows.

The present invention is directed to a file management device that manages files in an acquirable manner by using information on file saving locations included in management information to which link information registered in general control information is linked. The file management device includes: a selecting module that selects a file available for a predetermined usage out of a plurality of files; a management information creating module that creates management information including information on a saving location of the file selected by the selecting module; and a storage control module that registers link information to the management information created by the management information creating module in the general control information.

The file management device of the invention selects a file available for a predetermined usage out of the plurality of files, creates management information including information on a saving location of the selected file, and registers link information to the created management information in the general control information. The general control information in which link information has been newly registered and the management information are used to acquire a file afterwards. As such, files available for a predetermined usage are selected beforehand to create management information. Accordingly, files can be easily managed. Here, the "management information" may be stored in a storage medium in which the selected file has been stored or may be stored in a storage medium different from a storage medium in which the file has been stored.

In the file management device of the invention, the selecting module may select a file available for the predetermined usage based on file extension.

In one preferable embodiment of the file management device of the invention, the selecting module selects a file available for the predetermined usage out of the plurality of files stored in a portable storage medium, the storage control module creates a folder capable of storing files on a storage medium for storing, duplicates file selected by the selecting module, and saves the duplicated file in the created folder, and the management information creating module creates management information including information on saving locations of the duplicated file saved by the storage control module and saves the created management information in the folder.

In this preferable embodiment, the file management device may further include a name setting module that sets a management name used for management of the plurality of files, and the storage control module, in order to create the folder, may provide a folder name including the management name set by the name setting module for a folder capable of storing files, and the management information creating module may create the management information which is provided with a management information name including the management name and saves the created management information in the folder created by the storage control module.

In the file management device of the invention, the management information creating module may create the management information including metadata of the file selected by the selecting module. The management information creating module may otherwise create the management information including metadata created based on a predetermined definition. The management information creating module may otherwise create the management information including metadata created based on information included in the selected file.

The present invention is also directed to a printer that includes the file management device of the invention and a printing module which prints contents of a file selected by using the general control information and the management information of the file management device, with a colorant on a print medium.

The present invention is further directed to a file management method of managing files in an accessable manner by using information on file storage locations included in management information, which is a link destination of link information registered in general control information. The file management method includes the steps of: (a) selecting a file in a predetermined format processible by at least one of a reproduction process and a printing process, among multiple files stored in a portable storage medium; (b) setting an administration name used for management of the multiple files; (c) creating a folder for storage of files in an archival storage medium and storing a duplicate of a file newly selected in the step (a) into the created folder: (d) generating management information including information on a file storage location of the file newly selected by in the step (a) and stored into the archival storage medium in the step (c) with allocation of management information name including the administration name set in the step (b). and storing the generated management information into the folder created in the step (c): and (e) registering link information to management information newly generated in the step (d) into the general control information.

In the file management method of the invention, the step (a) may select a file available for the predetermined usage based on file extention.

In the file management method of the invention, the step (d) may generate the management information including metadata of the file newly selected in the step (a). The step (d) may otherwise create the management information including metadata created based on a predetermined definition. The step (d) may otherwise create the management information including metadata created based on information included in the selected file.

The present invention is further directed to a program that causes one or multiple computers to execute the respective steps of the file management method of the invention described above. The program of the invention may be recorded in a computer readable recording medium (for example, a hard disk, a ROM, an FD, a CD, or a DVD), may be transferred from one computer to another computer via a transfer medium (a communication network like the Internet or a LAN), or may be transmitted in any other suitable form. Only a single computer may execute all the steps or multiple computers may share execution of the steps of the file management method of the invention. Thus, the same effects of the file management method described above can be obtained.

BRIEF DESCRIPTION OF THE DRAWINGS

FIG. 11(a) is an explanatory view of a split layout screen 82, FIG. 11(b) is an explanatory drawing of an enlarged display screen 84, and FIG. 11C is an explanatory drawing of a metadata display screen 85.

DESCRIPTION OF THE PREFERRED EMBODIMENTS

Figure 1:
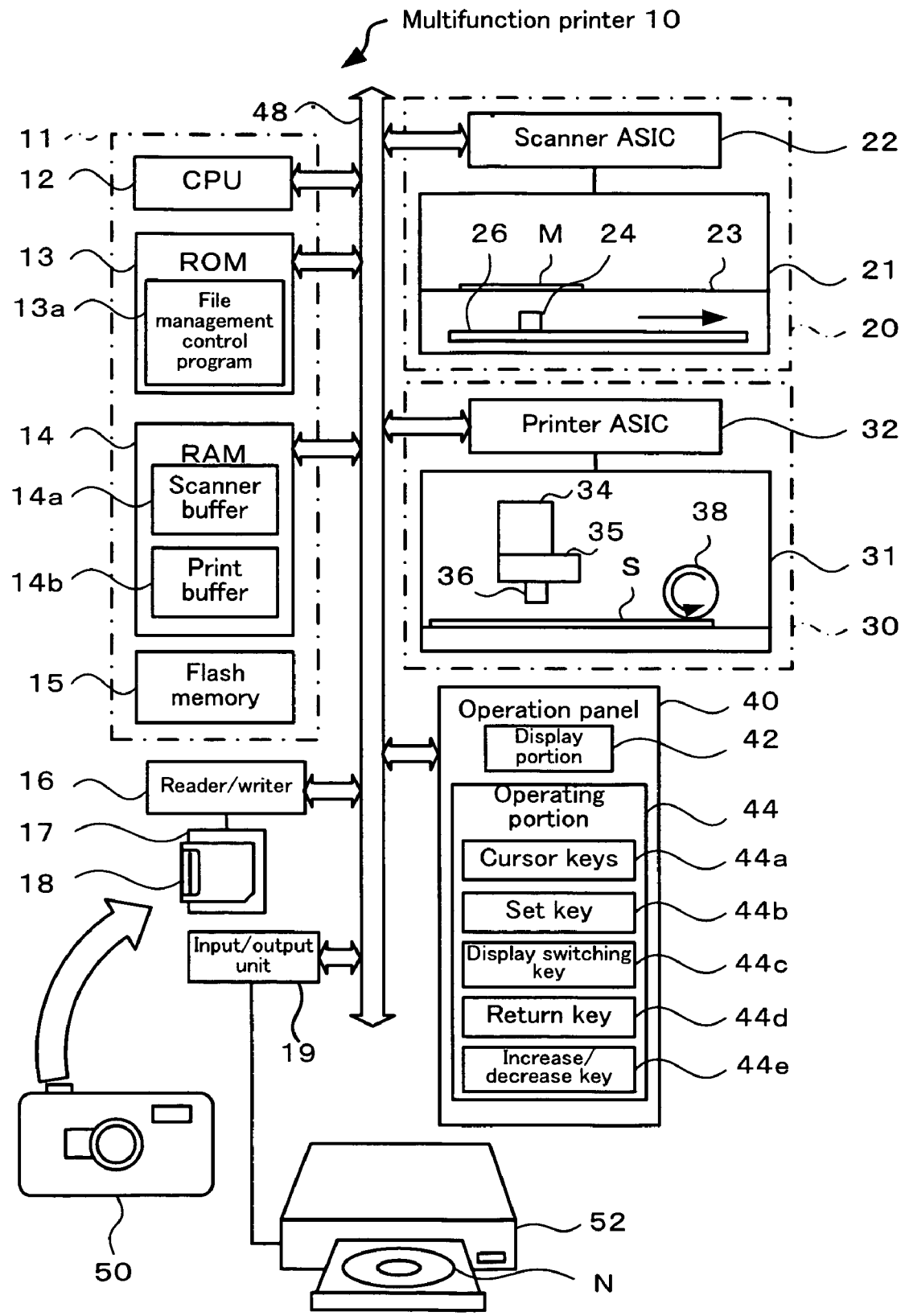
FIG. 1 is a block diagram of a multifunction printer 10 of one embodiment of the invention.
Figure 2:
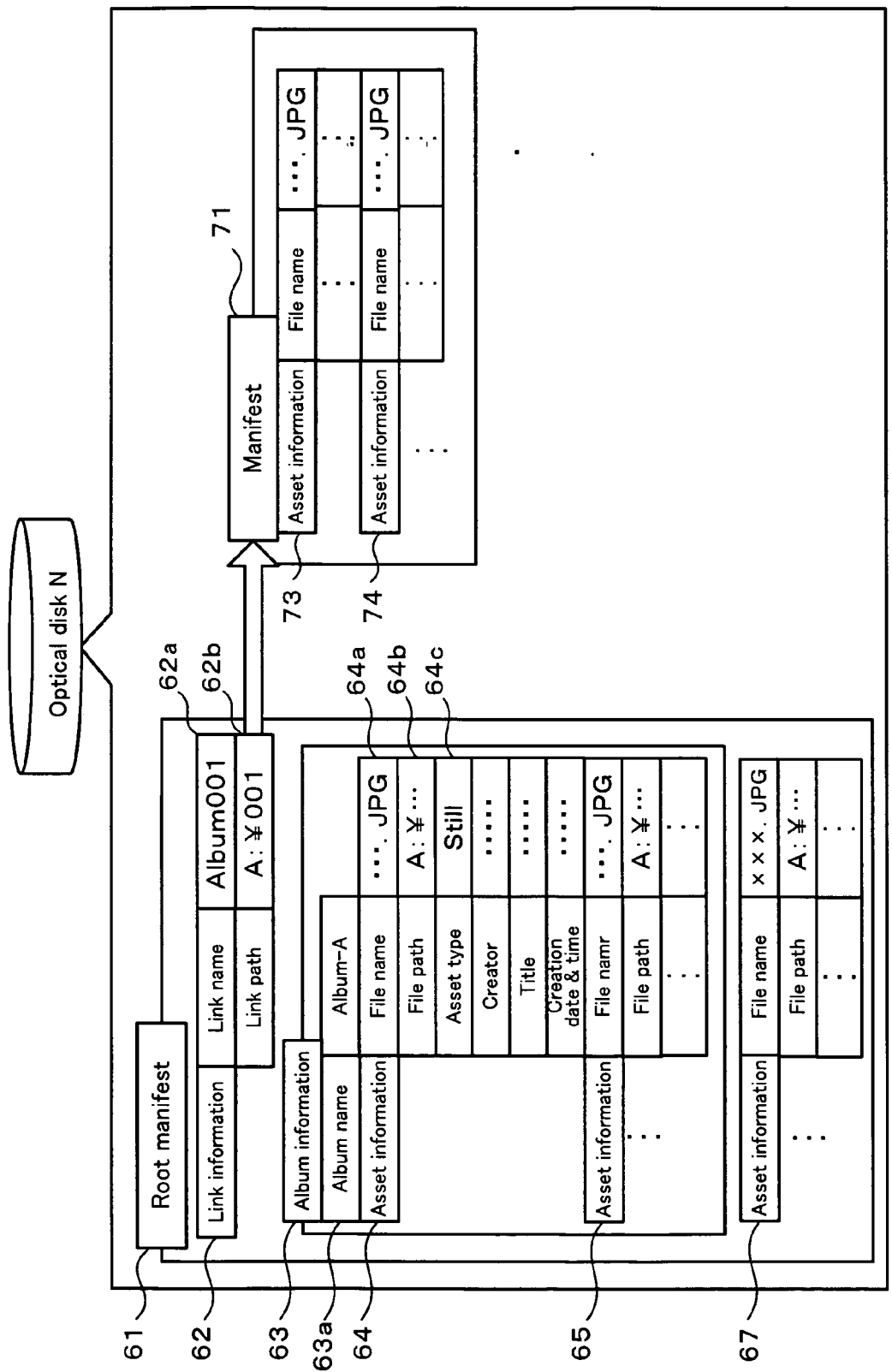
FIG. 2 is an explanatory drawing of manifests of the embodiment.
Figure 3:
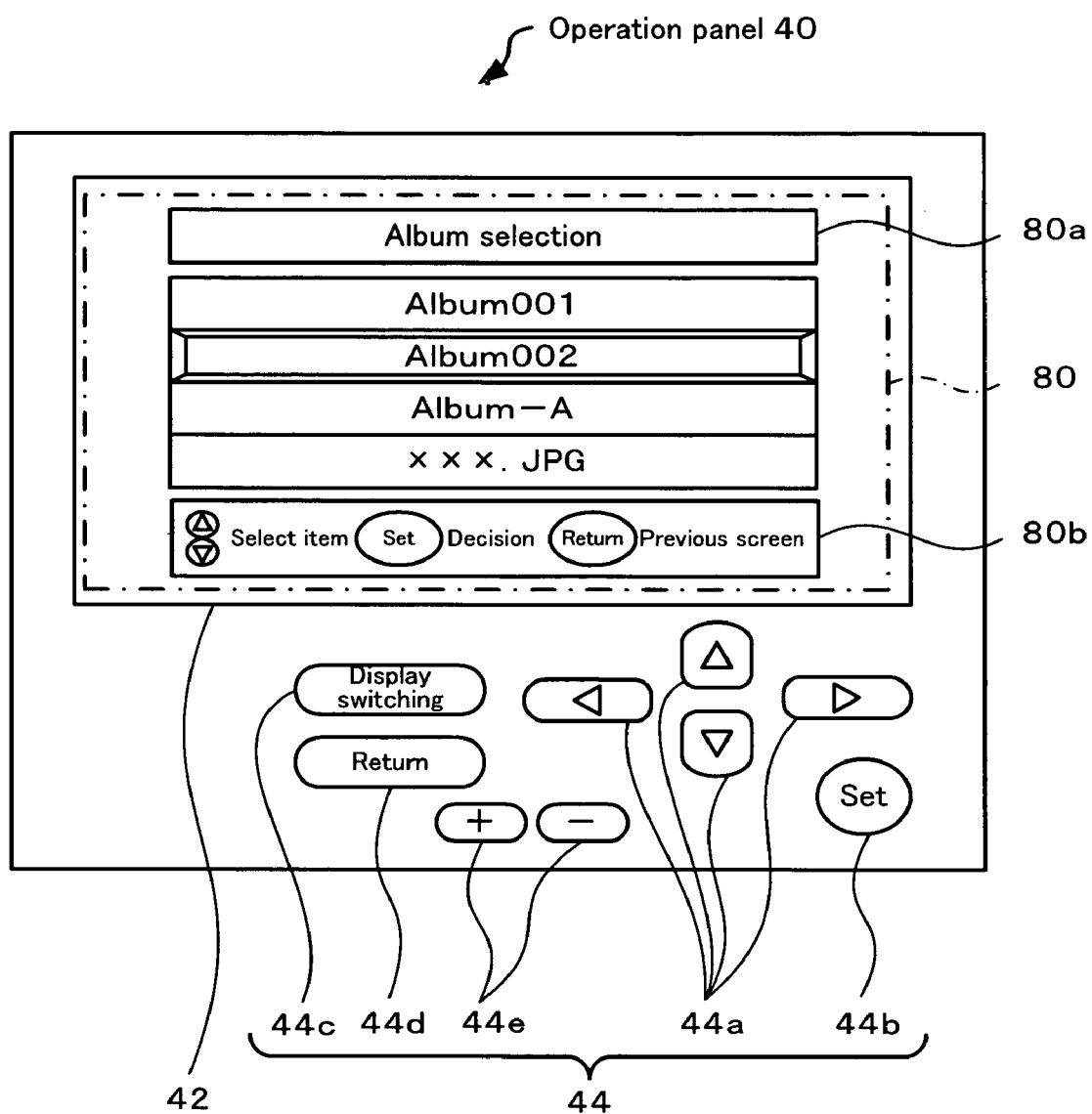
FIG. 3 is an explanatory drawing of an operation panel 40 of the present embodiment.

The best mode for carrying out the present invention will be described by way of embodiments. FIG. 1 is a block diagram of a multifunction printer 10 being an embodiment of the present invention. FIG. 2 is an explanatory drawing of manifests. FIG. 3 is a conceptual diagram of an operation pane l 40. The multifunction printer 10 includes, as shown in FIG. 1, a reader/writer 16 that is connected to a memory card 18 inserted into a slot 17 so as to be capable of reading and writing, an input/output unit 19 that can be connected to an external apparatus, a scanner unit 20 including a scanner mechanism 21 that executes a scanner function and a scanner ASIC 22 that controls the scanner mechanism 21, a printer unit 30 including a printer mechanism 31 that executes a printer function and a printer ASIC 32 that controls the printer mechanism 31, an operation panel 40 with which a user inputs various instructions, and a controller 11 that controls the whole operations of the device. Here, the "ASIC" is an abbreviation for "Application Specific Integrated Circuit."

The scanner unit 20 includes the scanner mechanism 21 and scanner ASIC 22. The scanner mechanism 21 is of a so-called flat bed type, and includes a glass surface 23 for placing a medium M from which an image is read out, a line image sensor 24 that optically reads out the medium M via the glass surface 23, and a shift portion 26 that makes the line image sensor 24 carry out scanning to read out the medium M. The scanner ASIC 22 is an IC chip with a function to control the scanner mechanism 21, and stores scan data read out by the line image sensor 24 of the scanner mechanism 21 in a scanner buffer 14a provided on a RAM 14 of the controller 11. The line image sensor 24 of the embodiment is a well-known color image sensor that emits light toward medium M and decompose a reflected light from the medium M into respective colors of red (R), green (G), and blue (B), so as to obtain scan data.

The printer unit 30 includes the printer mechanism 31 and printer ASIC32. The printer mechanism 31 is constructed as an ink-jet full-color printer. The printer mechanism 31 includes an ink cartridges 34 that respectively contain color inks of cyan, magenta, yellow, light cyan, light magenta, and black, a pressure generating portion 35 that applies pressure to the respective inks supplied from the ink cartridges, a discharge port 36 that discharges inks pressurized by the pressure generating portion 35 onto a recording paper S as a print medium, and a conveying roller 38 that conveys the recording paper S. The pressure generating portion 35 employs a system that deforms a piezoelectric element or the like by applying voltage thereto so as to pressurize inks. The pressure generating portion 35 may be otherwise contrructed to apply voltage to a heat element (for example, heater) to heat inks and pressurizes inks by bubbles generated by the heating. The printer ASIC 32 is an IC chip with a function to control the printer mechanism 31, and controls the printer mechanism 31 so as to develop print data in the print buffer 14b provided on the RAM 14 into a bitmap image on a page to page basis and print the developed data on the recording medium S.

The reader/writer 16 reads and writes data from and to the memory card 18 that is inserted into the slot 17 provided in a chassis of the multifunction printer 10. The memory card 18 is an electrically rewritable flash memory, and stores an image file and the like shot with a digital camera 50. Here, the image file shot with the digital camera 50 is saved in accordance with, for example, DCF (Design rule for Camera File system).

The input/output unit 19 includes terminals (for example, a USB terminal) connectable to an external apparatus such as an external storage 52. The external storage 52 is constructed as an optical disk drive that can write data into an optical disk N (for example, a DVD-R, a DVD-RW, a DVD-RAM, a CD-R, and a CD-RW) as a recording medium and delete the written data. The external storage 52 is connected to the input/output unit 19 via a cable to save data from the multifunction printer 10 in the optical disk N and output the data saved in the optical disk N to the multifunction printer 10 upon an instruction from the controller 11. The external storage 52 may be an external HDD or the like. The multifunction printer 10 is capable of storing an image file shot by a user in an MPV (Music Photo Video) format in the optical disk N set in the external storage 52. MPV is a standard that provides specifications of metadata to describe the details of assets being contents. An asset is one unit of a target handled in MPV, and includes a single image file (for example, a still image file) or a plurality of image files (for example, a plurality of still image files serially shot). Hereinafter, description will be given by use of the asset. In MPV, a manifest whose details have been described in XML as a markup language is used for a control file. In the manifest, metadata such as information on asset saving locations has been described. Accordingly, in the multifunction printer 10, what assets have been stored where on the optical disk N can be easily available by reading out and analyzing the manifest without reading out the respective assets themselves.

The concept of a manifest stored in the optical disk N will be described with reference to FIG. 2. A root manifest 61 is a manifest that is read in first by the controller 11 when an insertion of the memory card 18 has been recognized. The root manifest 61 includes link information 62 linked to another manifest 71. The root manifest 61 further includes album information 63 that can identify an album as a group of assets having a predetermined relationship such as having been shot at the same event (for example, a sports festival) or having been shot on the same day of photography, asset information 67 that can identify an asset that exists without being included in any album. The album information 63 includes an album name 63a that identifies an album, and asset information 64, 65, and any more. The asset information 64 includes a file name 64a to identify a file, a file path 64b to identify a saving location of the file, and an asset type 64c to distinguish an image type as well as an asset creator, an asset title, an asset creation date and time, and the like. The asset type may be Still, Still with Audio, Still Multishot Sequence, Still Panorama Sequence, Other, and the like. Other asset information in the manifest also include the same contents as the asset information 64.

The manifest 71 is a manifest to which the link information 62 registered in the root manifest 61 is linked. The link information 62 includes a link name 62a to identify a link and a link path 62b that is information on a saving location of the manifest 71. The link name 62a of the link information 62 is used as a title name related to the manifest 71 displayed in the display portion 42. The manifest 71 includes asset information 73, 74, and any more. Although the manifest 71 does not include any album, the multifunction printer 10 displays the link name of the link information 62 on an identical layer with an album name. For example, as shown in a selection screen 80 of FIG. 3, when the link name is set to "Album001" like an album name, this is displayed as if an album were selected on a screen display. Here, the root manifest 61 and manifest 71 may include other link information and other album information. Here, a manifest link means a concept of linking to another manifest, and the link information means information, such as, for example, a link name and a link path, that can concretely identify a manifest link. Asset means, in the present embodiment, a concept of one unit of a target handled in MPV, and asset information means information, such as, for example, an asset name and an asset path, that can concretely identify an asset. Moreover, an album means a concept of a group of one or more assets, and the album information means information, such as, for example, an album name, names of assets included in an album, and paths of assets included in an album, that can concretely identify an album.

The operation panel 40 is used by a user to input various instructions into the multifunction printer 10, and is, as shown in FIG. 1 and FIG. 3, provided with the display portion 42 for displaying characters, graphics, or symbols according to the various instructions and an operating portion 44 for carrying out various operations. The display portion 42 is composed of a liquid crystal panel that displays a color image. The operating portion 44 includes cursor keys 44a for shifting a cursor to select a process or a character and the like, a set key 44b for setting a selected process or the like, a display switching key 44c for switching a display displayed in the display portion 42 to another screen, a return key 44d for returning a screen displayed in the display portion to a previous screen, and increase/decrease keys 44e for increasing or decreasing the number of print copies of a selected image.

The selection screen 80 displayed in the display portion 42 lists link names Album001 and Album002 read out of the root manifest 61, an album name Album-A, and a file name of the asset information 67 in rectangular boxes arranged up and down. In this selection screen 80, a block that is currently being selected is displayed in a three-dimensional form, and allows change of selection target according to an operation of the cursor keys 44a. The selection screen 80 further includes a process display section 80a that displays a current process and an operating method display section 80b.

The controller 11 is constructed as a microprocessor composed mainly of a CPU 12 (see FIG. 1), and includes a ROM 13 that has stored various processing programs, a RAM 14 that temporarily stores data and saves data, and a flash memory 15 with respect to which data can be written and deleted. The controller 11 is connected to the reader/writer 16, input/output unit 19, scanner ASIC 22, printer ASIC 32, and operation panel 40 via a bus 48. The ROM 13 is a nonvolatile storage device and stores a file management control program 13a that is executed when saving an image file stored in the memory card 18 in an MPV format, various control programs, data on parts arranged in the screen, and the like. The RAM 14 includes a plurality of regions, and the scanner buffer 14a that temporarily stores image information read by the scanner unit 20 and print buffer 14b that temporarily stores image information to be printed by the printer unit 30 are provided in these regions.

The operations of the multifunction printer 10 thus constructed will be next described. The description regards, in particular, an operation to save, in an MPV format, an image file stored in the memory card 18 in the optical disk N set in the external storage 52.

Figure 4:
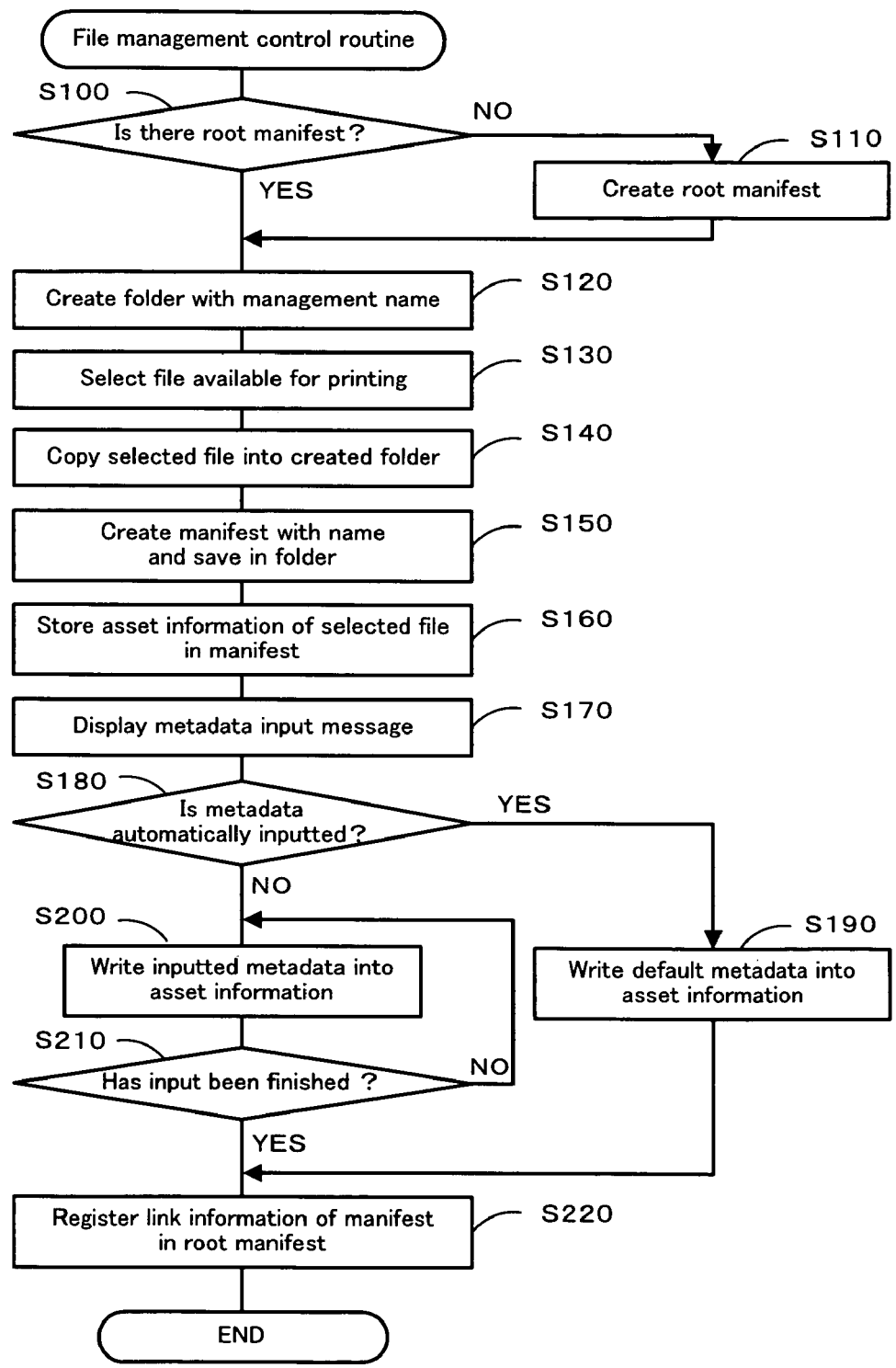
FIG. 4 is a flowchart showing a file management control routine of the embodiment.

FIG. 4 is a flowchart showing a file management control routine executed by the CPU 12 of the controller 11. This routine is stored in the ROM 13, and is executed by the CPU 12 when a user has selected execution of an MPV format save on a menu screen displayed in the display portion 42 after inserting the memory card 18 into the slot 17 of the reader/writer 16 and connecting the external storage 52 to the input/output unit 19. The MPV format save is to save a normal image file or the like saved according to, for example, a DCF format in a condition that the file can be handled in MPV. Here, description regards the operation of the CPU12 to save a plurality of files stored in the memory card 18 in an MPV format in an optical disk N (DVD-RW or the like) that is data writable and deletable.

Figure 5:
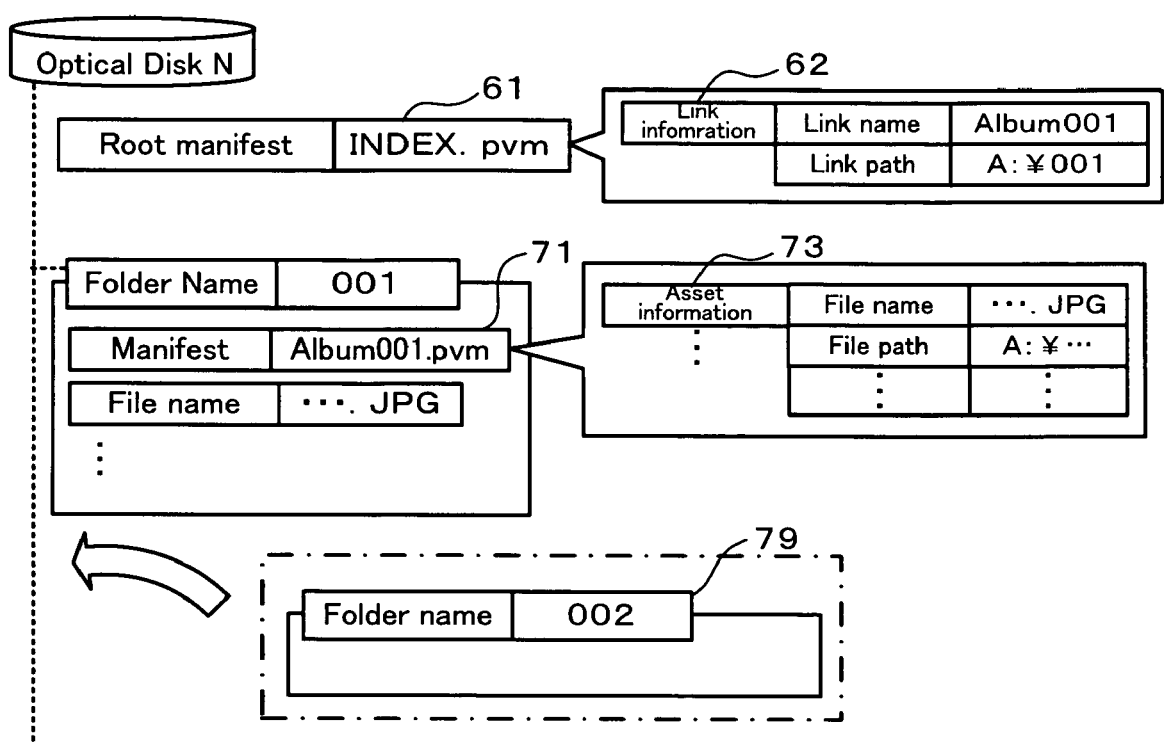
FIG. 5 is an explanatory drawing of folder creation of the embodiment.
Figure 6:
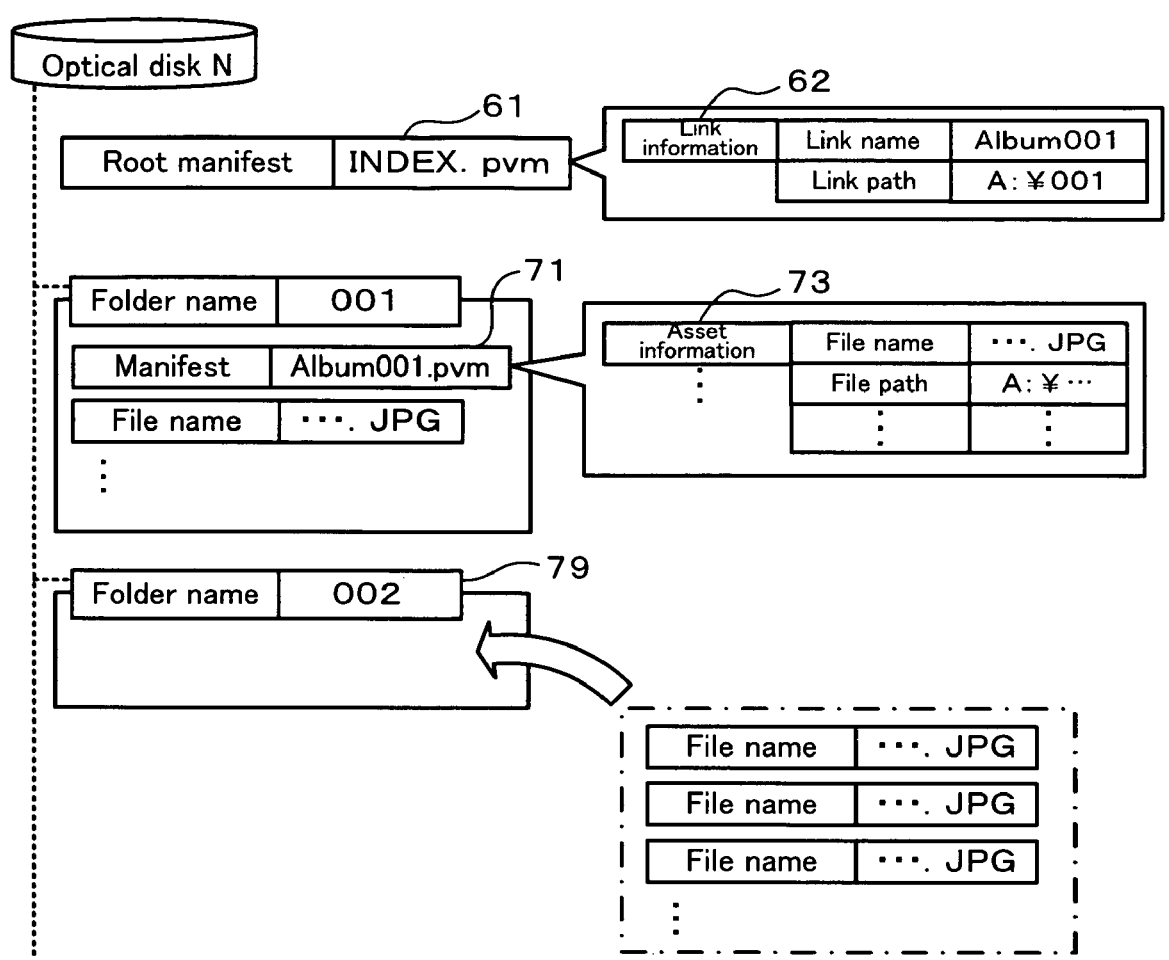
FIG. 6 is an explanatory drawing of file copying of the embodiment.
Figure 7:
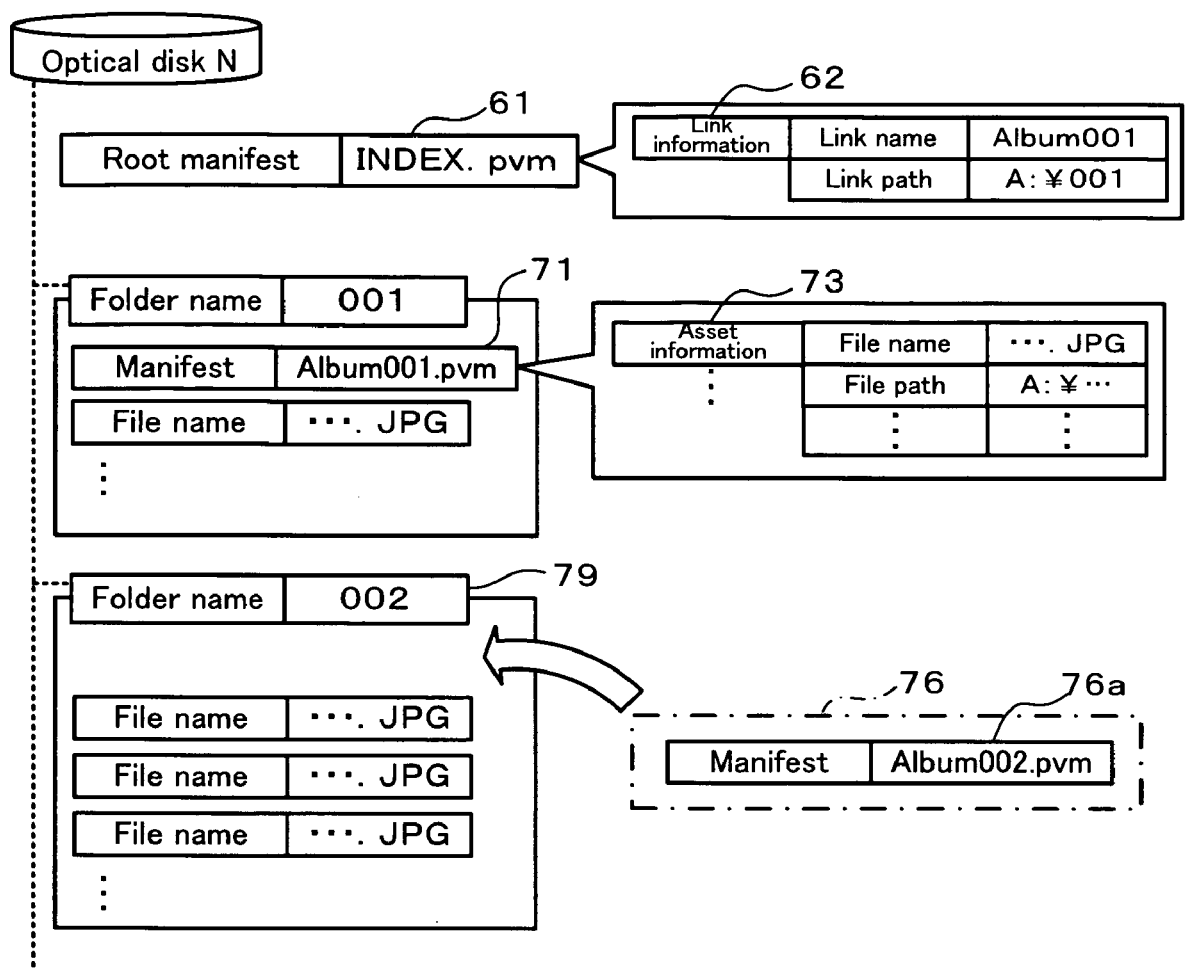
FIG. 7 is an explanatory drawing of manifest creation of the embodiment.
Figure 8:
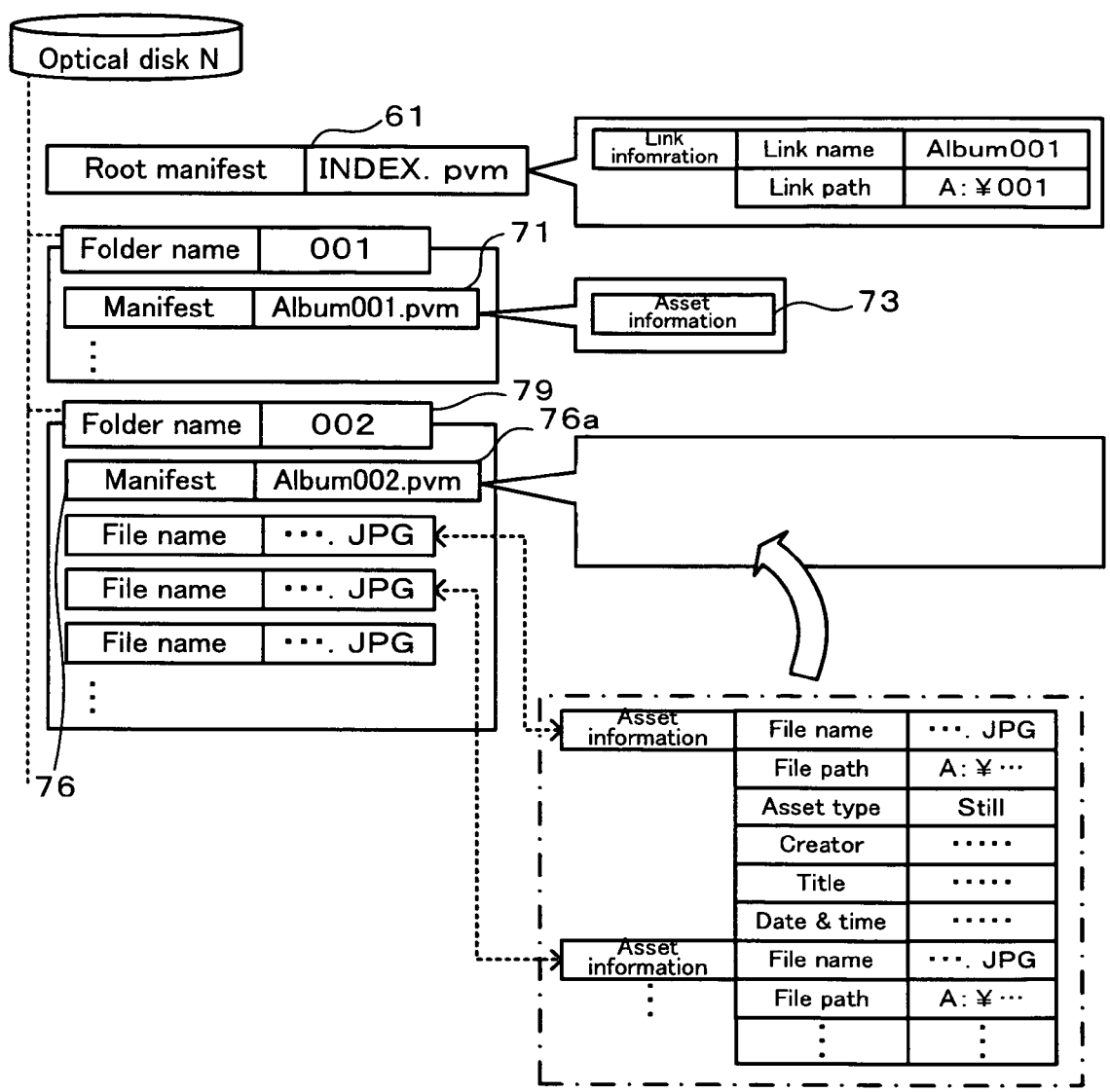
FIG. 8 is an explanatory drawing of storage of asset information in a manifest of the embodiment.
Figure 9:
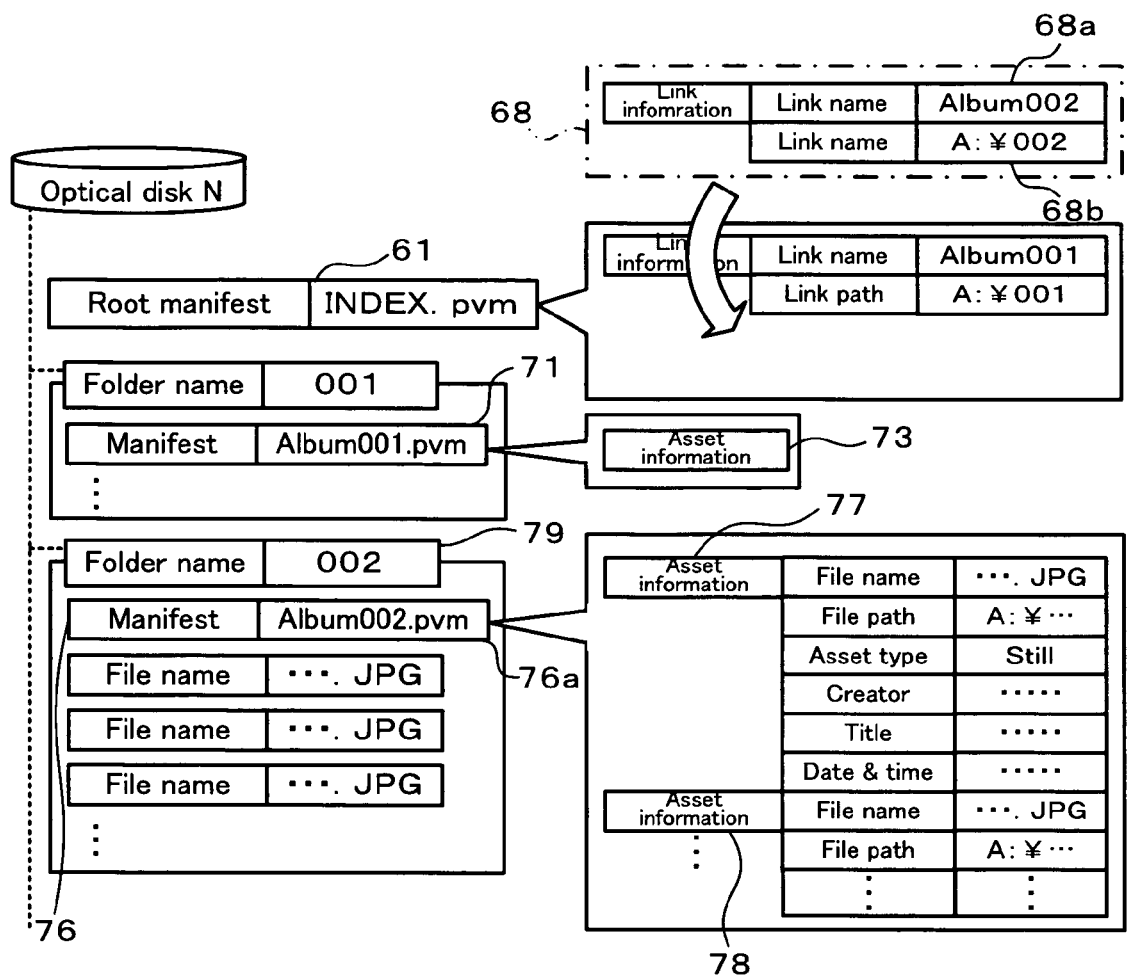
FIG. 9 is an explanatory drawing of registration of link information in a root manifest of the embodiment.

When the file management control routine of FIG. 4 is started, the CPU 12 determines whether or not a root manifest has been stored in the optical disk N (step S100) and if no root manifest has been stored, creates a root manifest (step S110). This root manifest is created in a root directory on the optical disk N. In the newly created root manifest, link information and album information have not yet been registered. If a root manifest has been stored in step S100 or after a root manifest is created in step S110, the CPU 12 creates a folder having a management name as a folder name in the root directory on the optical disk N (step S120). FIG. 5 is an explanatory drawing of folder creation, FIG. 6 is an explanatory drawing of file copying, FIG. 7 is an explanatory drawing of manifest creation, FIG. 8 is an explanatory drawing of storage of asset information in a manifest, and FIG. 9 is an explanatory drawing of registration of link information in a manifest. The management name is given based on a definition file by the CPU 12. Here, the definition file has been stored in the ROM 13 and defined so as to give a number obtained by counting up a three-digit number "001" in order as the management number every time a new folder is created, for example (see FIG. 5). Concretely, a number given last is saved in the flash memory 15 of the controller 11, and a number counted up by one from the last number is to be given for a newly created folder as a folder name.

After step S120, the CPU 12 selects files that are available for the multifunction printer 10 to print from the plurality of files stored in the memory card 18 (step S130), and copies the selected files into the folder created in step S120 (step S140). Here, image files have been set as the files available for printing, and these image files are selected based on file extensions. Concretely, the CPU 12 determines that still-image extensions jpg (jpeg) and bmp, movie extensions mpg (mpeg) and mov, and the like are available for printing, determines that an extension raw is available for printing if an identification table to judge that it is raw data exists, and determines that audio extensions mp3 and aac and the like are unavailable for printing. The movie extensions may be determined to be unavailable for printing if a definition to specify a predetermined frame exists. As such, among files stored in the memory card 18, the CPU12 selects only the available files for printing and does not select a file (for example, music file) that is not available to the multifunction printer 10 for printing.

The CPU 12 subsequently creates a new manifest having a file name as a management information name including the management name set this time and saves the created manifest in the folder created in step S120 (step S150). Here, the file name of the manifest is created by adding the three-digit number of the management number after "Album" (see FIG. 7). As such, the folder in which files are saved and the manifest stored in this folder share the common management name.

After step S150, the CPU 12 stores information on saving locations of the respective files copied into the folder as file paths of asset information of the created manifest (S160), and makes the display portion 42 display a message as to whether or not to automatically input metadata of the respective files (S170). The CPU 12 determines whether or not automatic input of metadata has been instructed based on a depression of the set key 44*b* (step S180). When the automatic input of metadata has been instructed, the CPU 12 writes metadata according to a definition file into respective sets of asset information (step S190). According to this definition file, a creator, an asset title, and a creation date and time of the metadata included in asset information are to be automatically set. Concretely, as metadata to be automatically inputted, the creator is set as "multifunction printer 10," the asset title is set as a number provided (for example, 0001) in order of the copied files, and the creation date and time are set as an execution date and time of the file copying. Moreover, at the time of an automatic input, the contents of information on a creator, an asset title, and a creation date and time (such as date and time of photography) are automatically written into the asset information if any of the information has been included as file contents.

Figure 10:
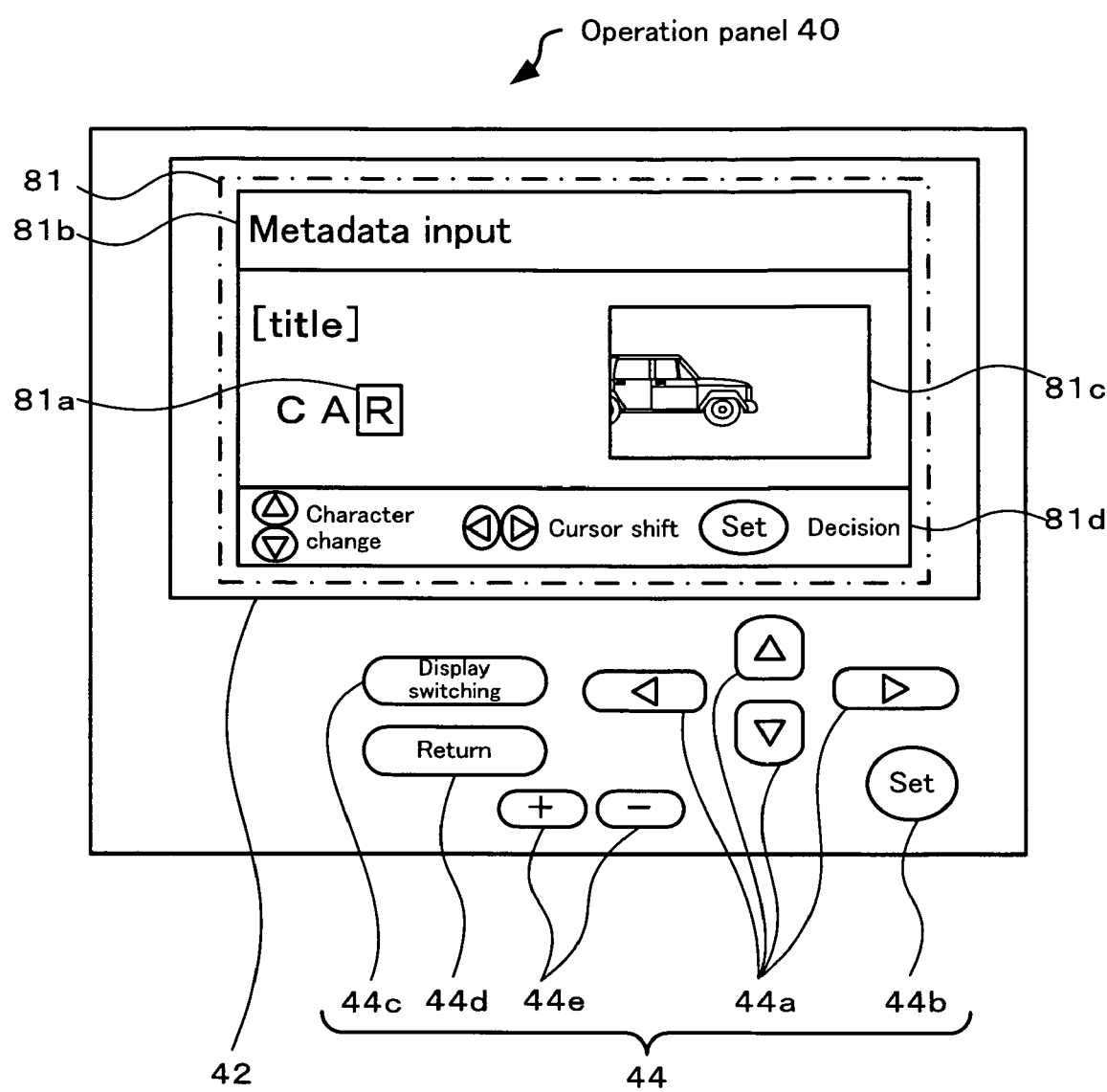
FIG. 10 is an explanatory drawing of a metadata input screen of the embodiment.

When the automatic input of metadata has not been instructed, that is, a manual input of metadata has been instructed in step S180, the CPU 12 writes the contents inputted via keys by the user into the asset information as metadata (step S200). FIG. 10 is an explanatory drawing of a metadata input screen 81 into which metadata is inputted by the user. The metadata input screen 81 inlcudes a cursor 81*a* to select a character to input, a title display bar 81*b* to display a screen title, a reduced image display portion 81*c* to display a thumbnail image of an asset, and an operating method display bar 81*d* that allows confirming an operating method. Similar to the case of an automatic input, for metadata by a manual input as well, it has also been set to input a creator, an asset title, and a creation date and time and the like. Concretely, the user sequentially inputs a creator, an asset title, and a creation date and time of each asset by confirming an image in the reduced image display portion 81*c*, switching characters with the up and down keys 44*a*, switching the position of the cursor 81*a*, and making a decision with the set key 44*b*. Then, the CPU 12 determines whether or not input of metadata by the user has been finished based on whether or not the input of metadata has been finished for all assets (step S210). If the input of metadata by the user has not been finished, the manual inputting process of the metadata is continued. Here, whether or not to automatically input metadata may be selected for each asset.

After automatically inputting metadata in step S190 or after the input of metadata by the user has been finished in step S210, the CPU12 registers link information of the manifest in the root manifest (step S220), and ends this routine. As shown in FIG. 9, link information 68 includes a link name 68*a* that is the same name as a manifest name 76*a* of a manifest 76 to which the link information 68 is linked and a link path 68*b* for linking to the manifest 76. The link name 68*a* is a title name displayed as a selection target when selecting an asset included in the manifest 76 (see FIG. 3). As such, a folder name 79 of the folder in which the files selected this time have been stored, the manifest name 76*a*, and the link name 68*a* displayed as a selection target in the display portion 42 share the common management name.

Lastly, description will be given of a series of operations of the multifunction printer 10 to save, in an MPV format, a plurality of files stored in the memory card 18 in the optical disk (DVD-RW or the like) of the external storage 52 with reference to FIG. 5 to FIG. 9. First, a user inserts the memory card 18 into the slot 17 of the reader/writer 16, connects the external storage 52 to the input/output unit 19, and selects a save execution in an MPV format. The CPU 12 confirms that the root manifest 61 has been stored in the optical disk N, sets a management name "002" based on the number stored in the flash memory 15 according to a definition file, and creates a folder having this management name on the optical disk (FIG. 5). The CPU 12 selects available files out of the plurality files stored in the memory card 18 based on file extensions, and copies the files selected this time into the created folder (FIG. 6). Subsequently, the CPU 12 creates the manifest 76 while giving a name "Album002," saves the same in the folder "002" (FIG. 7), and stores information on saving locations of the files selected and copied this time in the manifest 76 as asset information (FIG. 8). Then, upon receiving an instruction for automatic input of metadata from the user, the CPU 12 writes metadata set according to the definition file into respective sets of asset information, and registers the link information 68 to the manifest 76 in the root manifest 61 when all inputting has been finished (FIG. 9). As such, among files stored in the memory card 18, the CPU12 selects only the available files for printing and does not select a file (for example, music file) that is not available to the multifunction printer 10 for printing.

Figure 11:
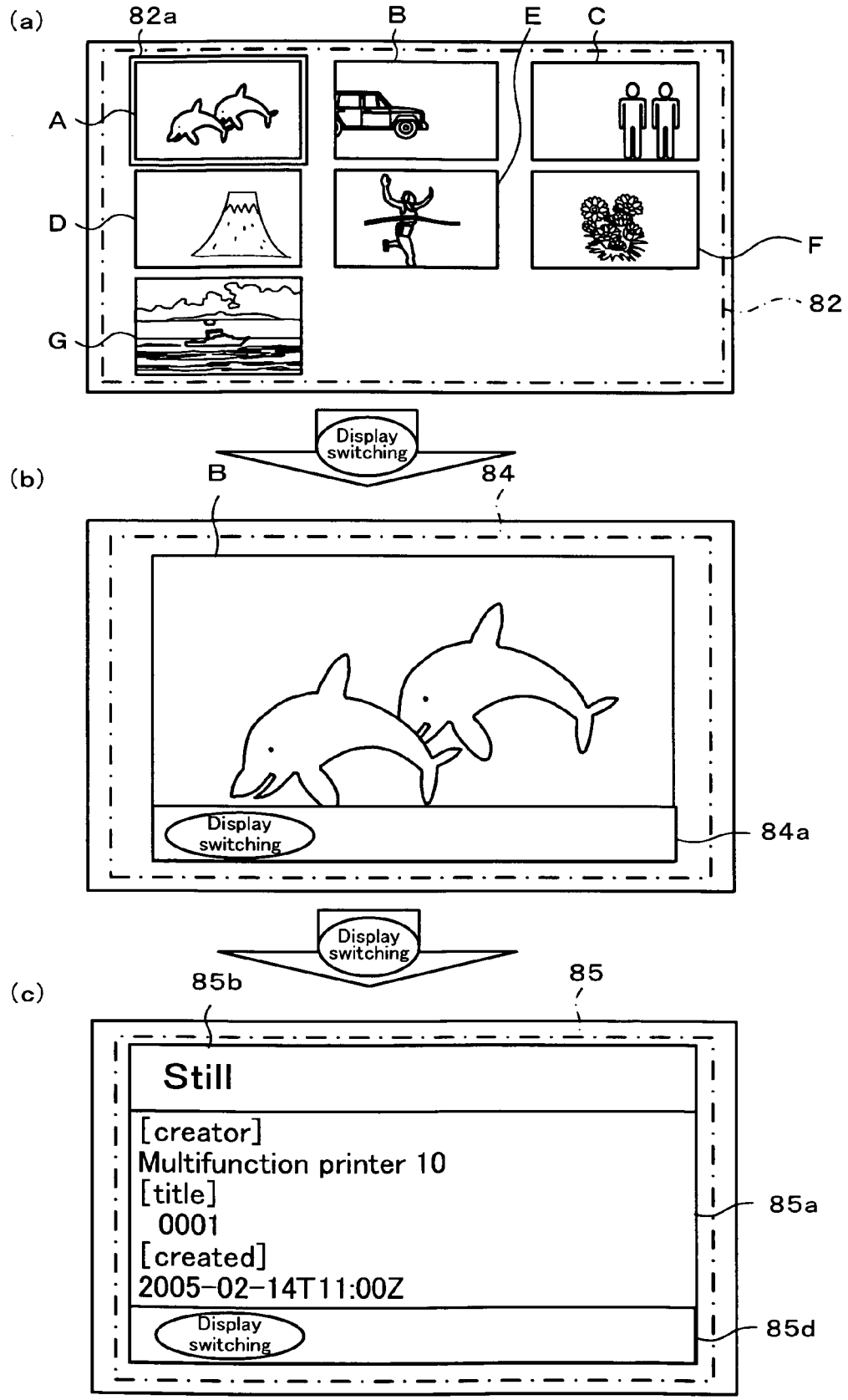
FIG. 11 are explanatory drawings of switching among screens displayed in a display portion 42 of the embodiment, where

Next, description will be given of a series of operations of the multifunction printer 10 to carry out a printing process while selecting an asset from the contents stored in an optical disk N with reference to FIG. 3 and FIG. 11. FIG. 11 are explanatory drawings of switching among asset selecting screens displayed in the display portion 42, where FIG. 11(a) is an explanatory view of a split layout screen 82, FIG. 11(b) is an explanatory drawing of an enlarged display screen 84, and FIG. 11(c) is an explanatory drawing of an metadata display screen 85. First, a user connects the external storage 52 to the multifunction printer 10, sets the above-described optical disk N in the external storage 52, and executes a selecting process of files to print. The CPU 12 reads out the root manifest 61 stored in the optical disk N, and displays the read out contents in the display portion 42 while reflecting the same in the selection screen 80 (see FIG. 3). When the "Album002" is selected by the user and the display switching key 44c is depressed in confirmation of this display screen 80, the CPU 12 displays a split layout screen 82 in which thumbnail images of assets included the manifest 76 as a linking destination have been displayed in the display portion 42 (FIG. 11(a)). At this time, when the display switching key 44c is depressed by the user, the CPU 12 displays an enlarged display screen 84 to display, out of the images A to G displayed on the split layout screen 82, an image (here, image A) that is currently being selected by a cursor 82a in an enlarged manner in the display portion 42 (FIG. 11(b)). When the display switching key 44c is depressed during a display of the enlarged display screen 84, the CPU 12 displays a metadata display screen 85 in the display portion 42 (FIG. 11(c)). The metadata display screen 85 includes the information automatically inputted in step S190 of the file management control routine. When the user who has confirmed the contents sets the number of print copies with the increase/decrease keys 44e and depresses the set key 44b, the CPU 12 carries out a printing process of the selected asset image. Concretely, the CPU 12 issues a print command to the printer ASIC 32 upon receiving a print instruction from the user. Upon receiving the print command, the printer ASIC 32 develops print data stored in the print buffer 14b of the RAM 14 into a bitmap, drives an unillustrated drive motor to rotate the conveying roller 38 so as to convey a recording paper S, and prints an image on the recording paper S based on the image data developed into a bitmap by controlling voltage to the pressure generating portion 35.

Here, a correspondence between the components of the present embodiment and components of the present invention will be clarified. The controller 11 of the present embodiment corresponds to a selecting module, a management information creating module, a storage control module, and a name setting module of the present invention, and the printer mechanism 31 corresponds to a printing module. The memory card 18 corresponds to a portable storage medium, the optical disk N corresponds to a storage medium for storing, the root manifest 61 corresponds to general control information, and the manifest 71 and manifest 76 correspond to management information. In the embodiment, the description of the operations of the multifunction printer 10 also clarifies an example of the file managing method of the present invention.

The multifunction printer 10 of the present embodiment described above in detail selects files available for printing out of a plurality of files stored in the memory card 18, creates the manifest 76 including information on saving locations of the selected files, and register the link information 68 to the created manifest 76 in the root manifest 61. Then, the multifunction printer 10 uses the root manifest 61 in which the link information has been registered and the manifest 76 to carry out file acquisition and the like. As such, files available for printing are selected beforehand to create the manifest 76. With this structure, it is easy to manage the files. Moreover, since files available for printing are selected based on file extensions, the available files can be relatively easily searched.

In the multifunction printer 10 described above, the files and manifest 76 are backed up to the optical disk N for storing from the portable memory card 18 with respect to which writing and deletion are frequently carried out. The files are thus securely stored. In the multifunction printer 10 described above, the manifest 76 and files registered in this manifest 76 are saved in the newly created common folder based on files stored in the portable memory card 18. It is thus easier to manage the files than when the manifest 76 and files are saved in separate recording media or folders. In the multifunction printer 10 described above, the common management name "002" is included in the manifest name 76a, the folder name 79, and the link name 68a as a title name. The relationship between the manifest 76 and folder and title names can be easily recognized.

The multifunction printer 10 described above creates the manifest 76 that includes metadata of the files selected this time. The contents of the files can be confirmed by using the metadata later. Moreover, the multifunction printer 10 described above creates the manifest 76 that includes metadata externally inputted via operation of the operating portion 44 by the user. This allows for user to freely create metadata. The multifunction printer 10 described above creates the manifest 76 that includes metadata prepared based on a predetermined definition file. The trouble of inputting metadata can be thus eliminated. The multifunction printer 10 described above creates the manifest 76 that includes metadata prepared based on information included in the files. By using the information included in the files, the trouble of inputting metadata can be thus eliminated.

And moreover, files available for printing are often selected out of a plurality of files to execute printing, and there is a great need to manage the variable files. Therefore, it is highly significant to apply the present invention to the multifunction printer 10.

The multifunction printer 10 constructed as above is by itself capable of managing files in MPV format without connecting to a personal computer or the like.

The present invention is by no means limited to the above-described embodiment, and as a matter of course, it can be carried out in various modes within the technical scope of the present invention.

In the above embodiment, a plurality of files stored in the memory card 18 are saved to an optical disk N (DVD-RW or the like) of the external storage 52 in an MPV format. The saving location is not restricted to the external storage but may be the memory card 18. This allows managing available files without troublesome and complicated operations. In this case, the process in step S140 of the file management control routine for copying the selected files into the created folder may be omitted. This prevents a plurality of identical files from existing in the memory card 18, while allowing the selected files available in MPV format.

In the above embodiment, the manifest 76 and the folder for storing the manifest 76 are sequentially written into the optical disk N in the file management control routine. In one modified structure, after the procedure of creating a folder, creating a manifest, and registering link information to the manifest in the root manifest is performed on the RAM 14, data saved on the RAM 14 may be written into the optical disk N. This allows for the data to be readily saved in an unrewritable storage medium (DVD-R, CD-R, or the like).

In the above embodiment, file metadata is inputted by operating the operating portion 44. In one modified structure, an infrared communications port may be provided on the multifunction printer 10, and file metadata may be inputted using an external apparatus (for example, a portable telephone) capable of exchanging information with the provided infrared communications port. This allows a more advanced input such as a Chinese character (Kanji) input. In another modified structure, a user may store a text file in which metadata has been inputted in the memory card 18 beforehand and make the printer read in the stored text file, so as to input file metadata.

In the above embodiment, although this has not particularly been described, saving the created manifest 76 and registering the created link information to the root manifest 61 may be permitted only in a optical disk N where the root manifest 61 has been created by a specific type of machine. Compatibility can thus be maintained.

In the above embodiment, files available for printing are selected based on extensions in the step S130 of the file management control routine. This is not restrictive and in one modified structure files available for printing maybe selected by, for example, extracting an image size (it can be resolution as well) included in Exif (Exchange Image File Format) information stored inside the file and comparing the extracted image size (resolution) with a printable size (resolution) of the multifunction printer 10. In another modified structure, when a manifest has been stored in the memory card 18, file available for printing may be selected based on the asset type included in the manifest by reading out the stored manifest. For example, it may be determined that the file is available for printing when the asset type is any of a still image (Still), a multi-shot image (Still Multishot Sequence), and a panorama image (Still Panorama Sequence), while the file is unavailable for printing when the asset type is audio (Audio) or video (Video), and the file is available for printing if a predetermined condition is satisfied when the asset type is an image with audio (Still with Audio).

In the above embodiment, the description regards the multifunction full-color printer 10 employing an ink-jet system. However, this is not restrictive and the invention may be applied to an electrophotographic color laser printer, a thermal transfer color printer, a dot impact printer, monochrome printing types of these printers, or a fax or a copier as a printer. The present invention may be also applied to an image processor and the like such as a personal computer, a scanner, a digital camera, and a digital video. Moreover, in the above embodiment, a description has been given of images shot with the digital camera 50. However this is not restrictive and images may be scanned with the scanner unit 20. Furthermore, in the above embodiment, a description has been given of printable image files. However, this is not restrictive and files may be reproducible audio files.

The present application claims the benefit of priority from Japanese Patent Application No. 2005-095648 filed on Mar. 29, 2005, contents of which is incorporated herein by reference in their entirety.

What is claimed is:

1. A file management device that manages files in an accessible manner by using information on file storage locations included in management information, which is a link destination of link information registered in general control information, the file management device comprising:
 a portable storage medium that stores files;
 an archival storage medium that saves files;
 general control information that is used for managing files;
 management information to which link information registered in the general control information is linked;
 a general control information existence determination module that determines whether or not the general control information has been stored in the archival storage medium;
 a general control information generator that determines the general control information has not been stored in the archival storage medium by the general control information existence determination module, generates and stores a general control information in the archival storage medium;
 a processing assembly that performs at least one of a reproduction process and a printing process of a file in a predetermined format;
 a selecting file determination module that determines, based on a file extension, whether or not multiple files stored in the portable storage medium are in a predetermined format selected from a music file, a photograph file, and a video file;
 a selector that selects a file processable by the processing assembly among the multiple files stored in the portable storage medium based on a result of a determination by the selecting file determination module:
 a name setting module that sets an administration name used for management of the multiple files;
 a management information generator that generates management information including information on a file storage location of a file newly selected by the selector with allocation of management information name including the administration name set by the name setting module;
 a metadata input method determination module that determines either an automatic input of metadata or a manual input of metadata;
 a metadata input module that, when an instruction of the automatic input of metadata has been confirmed by the metadata input method determination module, inputs metadata according to a definition file which is registered beforehand, and when the instruction of the manual input of metadata has been confirmed, inputs contents inputted manually via keys as metadata and stores the inputted metadata into the management information generated by the management information generator;
 a storage controller that registers link information to management information newly generated by the management information generator into the general control information, creates a folder for storage of files in the archival storage medium with allocation of a folder name including the administration name set by the name setting module to the folder, stores a duplicate of the file newly selected by the selector into the created folder, and stores the management information generated by the management information generator with allocation of the management information name including the administration name into the created folder;
 a display unit that displays an image; and
 a display controller that, in response to setting of the portable storage medium in the file management device, reads out general control information stored in the portable storage medium, reads at least one piece of link information included in the read out general control information, and displays the at least one piece of read link information on the display unit in such a manner as to allow a user's selection;
 wherein, in response to the user's selection of link information out of the at least one piece of displayed link information, the display controller reads information on a file storage location included in management information as a link destination of the selected link information and displays information on a file included in the management information on the display unit by utilizing information on the file storage location.

2. The file management device according to claim 1, wherein the processing assembly is a printing module that prints a content of a file selected according to the general control information and the management information stored in the archival storage medium, with a colorant on a print medium.

3. A file management method of managing files in an accessible manner by using information on file storage locations included in management information, which is a link destination of link information registered in general control information with a portable storage medium that stores files, an archival storage medium that saves files, general control information that is used for managing files, and management information to which link information registered in the general control information is linked, the file management method comprising the steps of:
   (a) determining, by a computer processor, whether or not the general control information has been stored in the archival storage medium;
   (b) generating and storing a general control information in the archival storage medium when the general control information is determined that the general control information has not been stored in the archival storage medium in the step (a);
   (c) determining, based on a file extension, whether or not multiple files stored in the portable storage medium are in a predetermined format selected from a music file, a photograph file, and a video file;
   (d) selecting a file in a predetermined format processible by at least one of a reproduction process and a printing process, among the multiple files stored in a portable storage medium, based on a result of determination in the step (c);
   (e) setting an administration name used for management of the multiple files;
   (f) creating a folder for storage of files in the archival storage medium and storing a duplicate of a file newly selected in the step (d) into the created folder;
   (g) generating management information including information on a file storage location of the file newly selected in the step (d) and stored into the archival storage medium in the step (f) with allocation of management information name including the administration name set in the step (e), and storing the generated management information into the folder created in the step (f); and
   (h) determining either an automatic input of metadata or a manual input of metadata;
   (i) inputting metadata according to a definition file which is registered beforehand when an instruction of the automatic input of metadata has been confirmed in the step (h), and inputting contents inputted manually via keys as metadata and storing the inputted metadata into the management information generated in the step (g) when the instruction of the manual input of metadata has been confirmed;
   (j) registering link information to management information newly generated in the step (g) into the general control information, creating a folder for storage of files in the archival storage medium with allocation of a folder name including the administration name set in the step (e) to the folder, storing a duplicate of the file newly selected in the step (d) into the created folder, and storing the management information generated in the step (g) with allocation of the management information name including the administration name into the created folder;
   (k) in response to setting of the portable storing medium, reading out general control information stored in the portable storage medium, reading at least one piece of link information included in the read out general control information, and displaying the at least one piece of read link information on a display unit designed to display an image, in such a manner as to allow a user's selection; and
   (l) in response to the user's selection of link information out of the at least one piece of link information displayed in the step (k), reading information on a file storage location included in management information as a link destination of the selected link information and displaying information on a file included in the management information on the display unit by utilizing information on the file storage location.

4. The file management method according to claim 3, the file management method further comprising the step of:
   (m) printing a content of a file selected according to the general control information and the management information stored in the archival storage medium, with a colorant on a print medium.

* * * * *